(12) United States Patent
Widmann et al.

(10) Patent No.: US 7,425,889 B2
(45) Date of Patent: Sep. 16, 2008

(54) VEHICLE TURNING ASSIST SYSTEM AND METHOD

(75) Inventors: Glenn R Widmann, Noblesville, IN (US); Gregory K. Scharenbroch, Kokomo, IN (US); Joseph E. Harter, Jr., Kokomo, IN (US); Matthew R. Smith, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 182 days.

(21) Appl. No.: 11/123,421

(22) Filed: May 6, 2005

(65) Prior Publication Data

US 2006/0250225 A1 Nov. 9, 2006

(51) Int. Cl.
*B60Q 1/00* (2006.01)
(52) U.S. Cl. ............... 340/438; 340/425.5; 348/837
(58) Field of Classification Search ................. 340/438, 340/436, 937, 461, 425.5, 691.1, 691.6; 348/837, 348/838
See application file for complete search history.

(56) References Cited

U.S. PATENT DOCUMENTS

| | | | |
|---|---|---|---|
| 5,574,443 A | 11/1996 | Hsieh | |
| 5,680,123 A | 10/1997 | Lee | |
| 5,850,215 A * | 12/1998 | Kamiya et al. | 345/204 |
| 6,012,785 A * | 1/2000 | Kawasaki | 312/29 |
| 6,424,386 B1 * | 7/2002 | Shimizu | 348/837 |
| 6,633,347 B2 * | 10/2003 | Kitazawa | 348/837 |
| 6,789,843 B2 * | 9/2004 | De Gaillard | 348/837 |
| 6,939,155 B2 * | 9/2005 | Postrel | 439/297 |
| 6,940,423 B2 * | 9/2005 | Takagi et al. | 340/425.5 |
| 7,042,528 B2 * | 5/2006 | Lester et al. | 348/825 |
| 7,090,186 B2 * | 8/2006 | Quinno et al. | 348/837 |
| 7,136,115 B2 * | 11/2006 | Chen | 348/837 |
| 7,176,958 B2 * | 2/2007 | Jones | 348/373 |
| 2003/0080877 A1 | 5/2003 | Takagi et al. | |
| 2003/0090570 A1 | 5/2003 | Takagi et al. | |

FOREIGN PATENT DOCUMENTS

DE 20015730 1/2002
NL 1005126 8/1998

OTHER PUBLICATIONS

EP Search Report dated Aug. 28, 2006.

\* cited by examiner

*Primary Examiner*—John A Tweel, Jr.
(74) *Attorney, Agent, or Firm*—Jimmy L. Funke

(57) ABSTRACT

A turning maneuver assist system and method are provided for assisting the driver of a vehicle with a visual image while turning the vehicle. The system includes first and second cameras positioned to generate video images on respective first and second sides of the vehicle. The system also includes a drop-down display located onboard the vehicle for displaying images generated by the first and second video cameras. The system further includes a controller for controlling activation of the first and second cameras and the presentation of images on the display. The controller activates one of the first and second cameras and controls the display to output images captured by the activated camera when the vehicle is determined to be turning. The display is mounted forward and above the driver and moves between a stowed position and a viewable position.

22 Claims, 7 Drawing Sheets

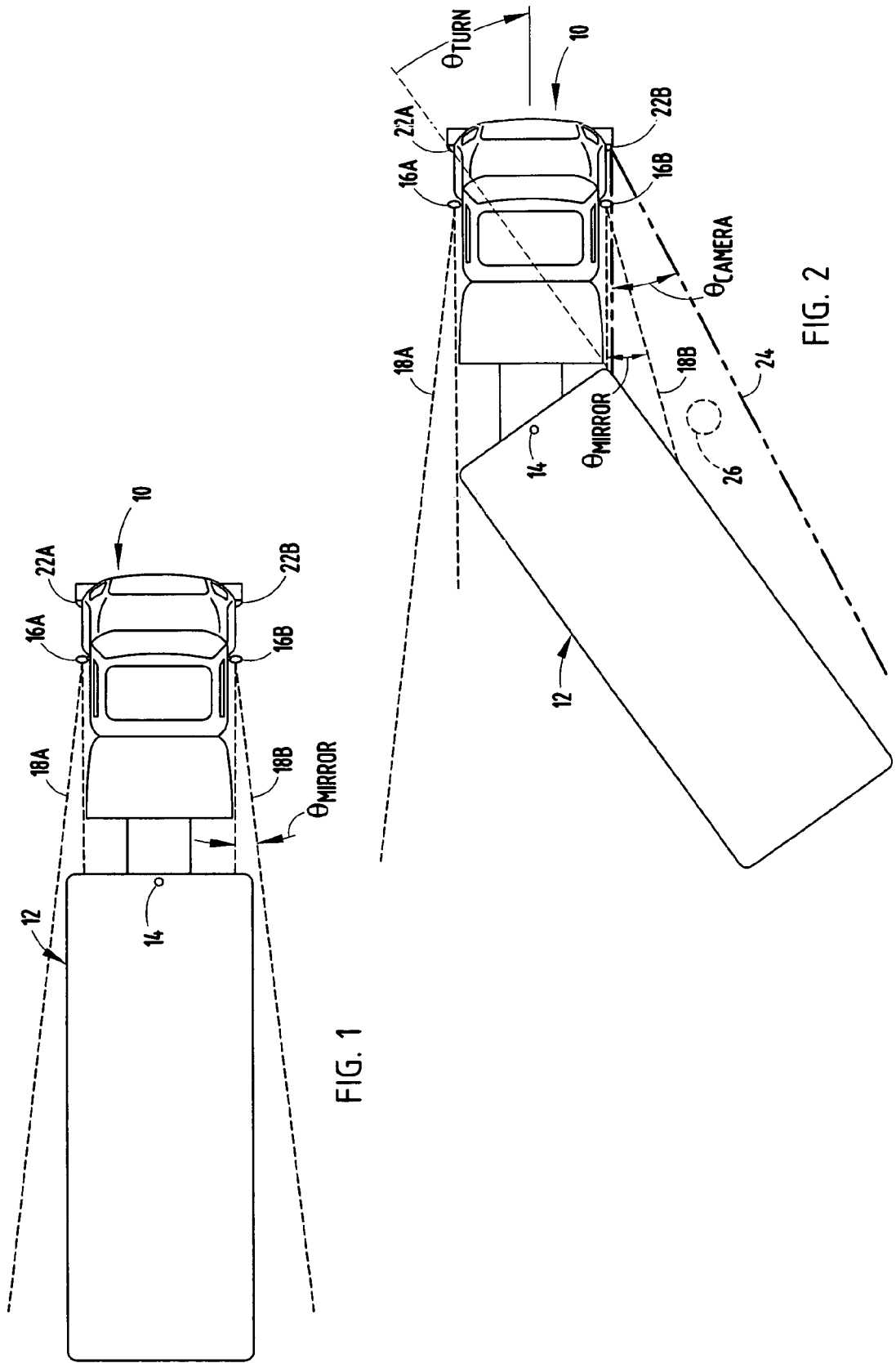

VEHICLE TURNING ASSIST SYSTEM AND METHOD

TECHNICAL FIELD

The present invention generally relates to vehicle imaging systems and, more particularly, to a video information system and method for assisting the driver of the vehicle when maneuvering turns, particularly for a trailering vehicle.

BACKGROUND OF THE INVENTION

Automotive vehicles are commonly equipped with exterior mounted side view mirrors located on both lateral sides of the vehicle. The side view mirrors allow the driver to generally view the exterior side regions of the vehicle. Typical mirror assemblies employ a linear or non-linear convex reflective lens providing a limited field of view (e.g., fifteen to twenty degrees (15°-20°)) to allow the driver to view the nearby side region. The side mounted mirrors assist the driver in detecting objects in the adjacent side lanes, particularly prior to performing a lane change maneuver.

The side view mirror assemblies alone are generally sufficient to monitor the adjacent lane for many automotive passenger vehicles. However, for vehicles hauling towed structures, such as passenger vehicles with towed trailers or commercial vehicles (e.g., semi-trucks) with towed trailers, the conventional side view mirror assembly alone may be insufficient to adequately monitor the entire side regions as the vehicle turns. When a trailering vehicle turns severely towards the left or right side, the vehicle, particularly the trailered body, is pulled in a travel path that projects into the turn.

With the conventional vehicle mirror assembly, the resulting field of view offered by the mirror does not allow the driver of the vehicle to easily view the entire path of the trailered body, thereby resulting in a trailer-side blind zone. In lieu of a conventional linear mirror, a non-linear convex mirror surface could be employed. However, the driver may find it difficult to optically interpret the non-linear mirror image that is presented.

It is therefore desirable to provide for a system and method that assists the driver of the vehicle when turning the vehicle. In particular, it is desirable to provide for such a system and method that enables the driver of a trailer towing vehicle to more easily manipulate sharp turning maneuvers of the vehicle.

SUMMARY OF THE INVENTION

In accordance with one aspect of the present invention, a turning maneuver assist system is provided for assisting the driver of a vehicle with a visual image while turning the vehicle. The system includes first and second cameras positioned to generate video images on respective first and second sides of a vehicle. The system also includes a display adapted to be located onboard the vehicle for displaying images generated by one of the first and second video cameras when one of the first and second video cameras is activated. The system further includes a controller for controlling activation of the first and second cameras and the presentation of images on the display. The controller activates one of the first and second cameras and controls the display to output images captured by the activated camera when the vehicle is determined to be turning.

According to another aspect of the present invention, a method of assisting a driver of a vehicle when the vehicle is turning is provided. The method includes the steps of determining when the vehicle is turning towards a first side. The method also includes the step of activating a first camera to capture video images on the first side of the vehicle when the vehicle is determined to be turning towards the first side. The method further includes the step of displaying the video images captured by the first camera on a display onboard the vehicle. The method further includes the step of deactivating the first camera when the vehicle is not turning sufficiently in a direction towards the first side.

Accordingly, the system and method of the present invention provide a video image on the display showing a view of the side region of the vehicle toward which the vehicle is turning. The system and method are particularly well adapted for use on a trailering vehicle to enable the driver to view a video image of a side region of the vehicle and the trailered body when the vehicle is performing a tight turning maneuver.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 1 is a top schematic view of a trailer towing commercial vehicle traveling in a straight line;

FIG. 2 is a top schematic view of the trailer towing commercial vehicle traversing a sharp turning maneuver towards one side and employing a turning assist system according to the present invention;

DESCRIPTION OF THE PREFERRED EMBODIMENT

Figure 3:
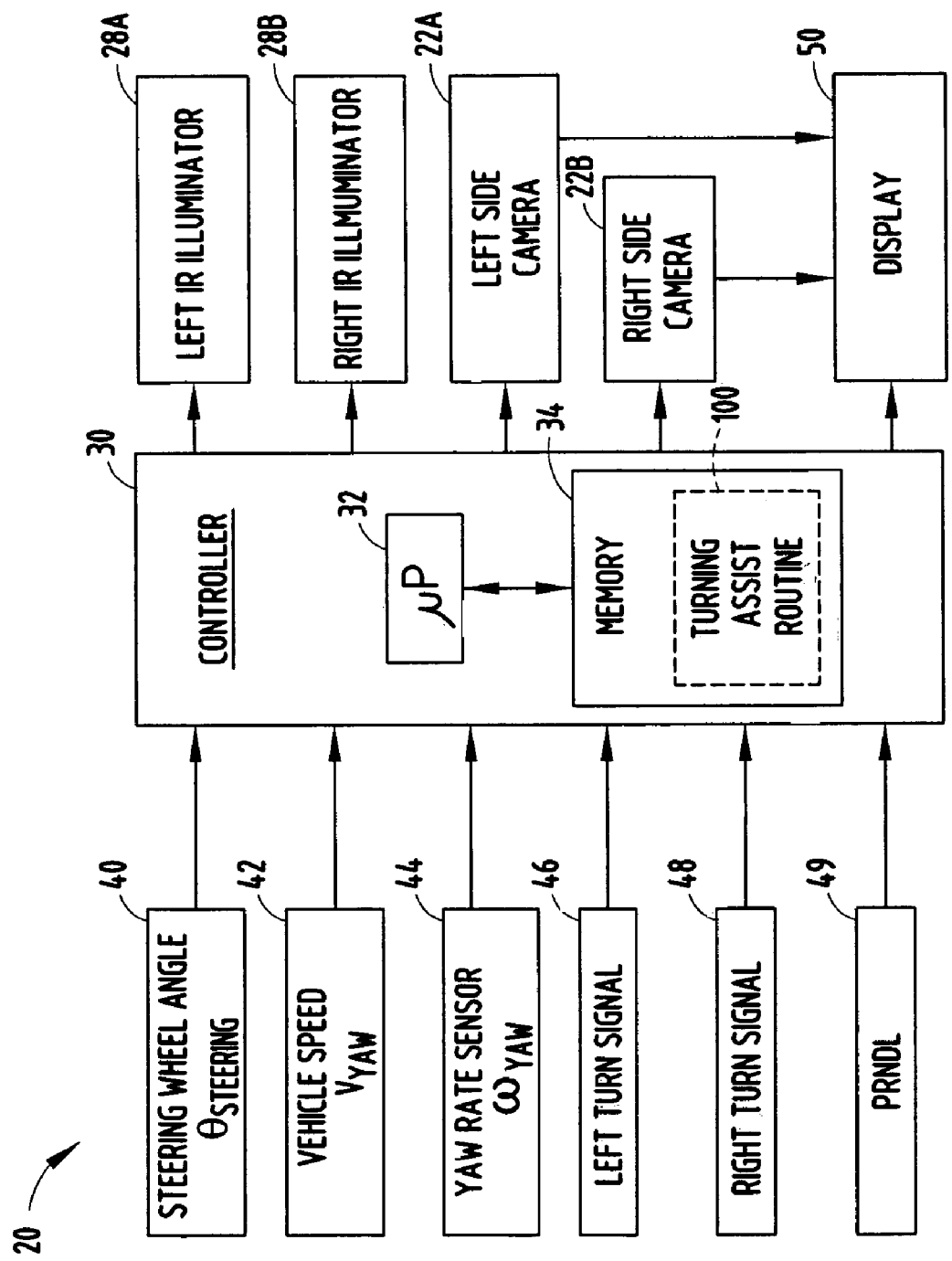
FIG. 3 is a block diagram illustrating the turning assist system of the present invention.

Referring to FIGS. 1 and 2, a trailer towing vehicle 10 is generally illustrated traveling in a substantially straight path in FIG. 1, and traversing a tight turn towards the right side in FIG. 2. The vehicle 10 may include a commercial vehicle, such as a semi-truck, towing a trailer body 12 according to one embodiment. According to another embodiment, vehicle 10 may include a passenger vehicle, such as a recreational vehicle, adapted to tow a trailer body 12. The vehicle 10 shown generally includes a hitch 14, such as a fifth wheel hitch, for connecting to the trailer body 12.

The vehicle 10 is shown having first and second externally mounted side view mirrors 16A and 16B. The first side view mirror 16A is mounted on the left side, also referred to as the driver side, of the vehicle 10 and allows the driver of the vehicle 10 to view a limited side region of the vehicle 10 within a limited field of view 18A. The second side view mirror 16B is mounted on the right side, also referred to as the passenger side, of the vehicle 10 and allows the driver to view the right side of the vehicle 10 within a limited field of view 18B. Mirrors 16A and 16B provide a viewing angle $\theta_{MIRROR}$ that defines the respective mirror fields of view 18A and 18B.

The vehicle 10 employs a turning maneuver assist system 20 for assisting the driver of the vehicle 10 in maneuvering turns according to the present invention. The turning maneuver assist system 20 includes a first video camera 22A located on the first side of the vehicle 10 and a second video camera 22B located on the second side of the vehicle 10. The first and second video cameras 22A and 22B are mounted on the vehicle 10 at unobtrusive locations on the respective lateral sides of the vehicle 10 that enable each of the cameras 22A and 22B to capture an enhanced field of view video image of the corresponding exterior side region of the vehicle 10.

The first video camera 22A provides a video image of a field of view that is wider than the field of view 18A of the reflective image seen on mirror 16A. Similarly, the second video camera 22B provides an enlarged field of view 24 wider than the field of view 18B provided by the second mirror 16B. The first and second video cameras 22A and 22B each provide an imaging angle $\theta_{CAMERA}$ that defines the corresponding camera field of view 24.

The first and second video cameras 22A and 22B may be mounted on the corresponding left and right exterior sides of the vehicle 10 looking rearward, so that each of cameras 22A and 22B is capable of providing a field of view 24 that is substantially parallel to the ground along the side region of the vehicle 10 and its trailer 12. Each of the first and second cameras 22A and 22B may possess a sufficient azimuth and elevation field of view 24 to allow a complete unobtrusive view along the entire side of the trailer 12 at the maximum turning angle between the vehicle 10 and its trailer 12.

In order to minimize the required camera field of view 24, the first and second video cameras 22A and 22B may be mounted towards the front of the vehicle 10, such as in a space behind the left and right corners of the front bumper of the vehicle 10, looking rearward. As a result, each of the first and second video cameras 22A and 22B is capable of providing a sufficient field of view 24 to observe objects, such as object 26 (e.g., curb, tree, utility pole, etc.), in the near side vicinity of the trailer 12 that may be in the travel path of the trailer 12 when the vehicle 10 traverses a turning maneuver at turning angle $\theta_{TURN}$, such as is seen in FIG. 2.

The turning maneuver assist system 20 is shown in FIG. 3 further having a controller 30, an onboard display 50, and left and right infrared (IR) illuminators 28A and 28B. The IR illuminators 28A and 28B may be activated at night to illuminate the field of view 24 of the corresponding left and right cameras 22A and 22B. The onboard display 50 receives the video images captured by the left and right video cameras 22A and 22B and displays the video images to the driver of the vehicle 10 when the vehicle 10 is turning.

The controller 30 receives a plurality of signal inputs, including a steering wheel angle $\theta_{STEERING}$ signal 40, a vehicle speed $V_{YAW}$ signal 42, a yaw rate $\omega_{YAW}$ sensor signal 44, a left turn signal 46, a right turn signal 48 and the transmission position signal PRNDL 49. Controller 30 has a microprocessor 32 and memory 34. The microprocessor 32 may include a conventional microprocessor having the capability for processing algorithms and data. Memory 34 may include read-only memory (ROM), random access memory (RAM), flash memory and other commercially available volatile and non-volatile memory devices. Stored within memory 34 and executed by microprocessor 32 is a turning assist routine 100. It should be appreciated that the controller 30 may include an electronic controller dedicated to the turning maneuver assist system 20, or may include a shared controller, such as a body controller of the host vehicle 10, according to other embodiments.

The controller 30 receives and processes any of a number of the inputs 40-49, and estimates the turning angle $\theta_{TURN}$, according to one embodiment. This may be achieved by employing a turning angle estimation routine. According to one embodiment, the turn angle $\theta_{TURN}$ is estimated as a function of vehicle speed $V_{YAW}$, yaw rate $\omega_{YAW}$ and steering angle $\theta_{STEERING}$. It should be appreciated that the turning angle $\theta_{TURN}$ may be determined based on any of a number of input signals.

Controller 30 processes the determined turning angle $\theta_{TURN}$ of the vehicle 10 and controls activation of the left and right cameras 22A and 22B and display 50, in order to assist the driver of the vehicle 10 by providing displayed video images of the side of the vehicle 10 towards which vehicle 10 is turning. Additionally, controller 30 may activate the left and right infrared illuminators 28A and 28B to provide sufficient illumination for capturing video images during nighttime operation. In addition, or alternatively, the illuminators 28A and 28B may include visible light illuminators.

Figure 4:
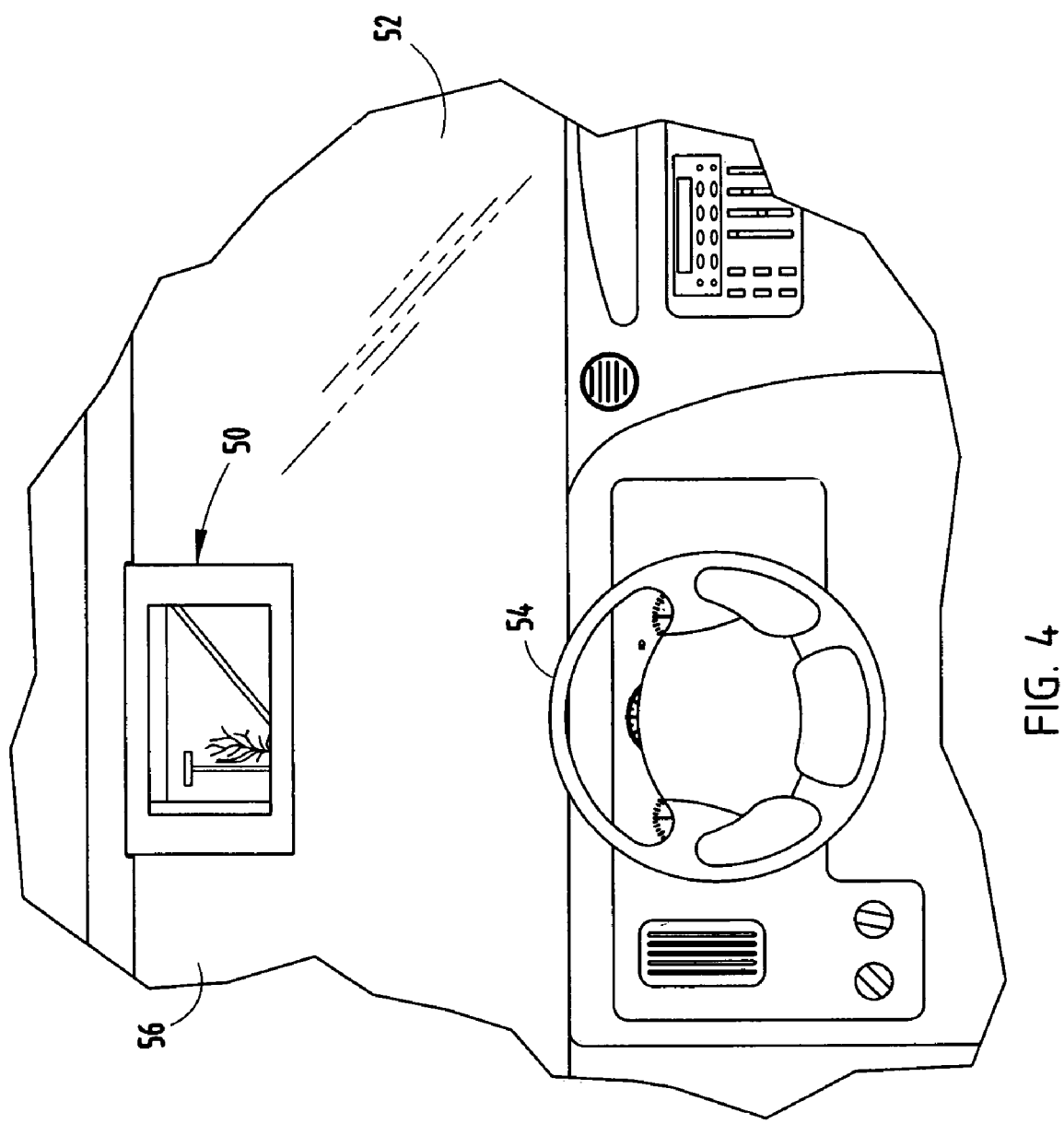
FIG. 4 is a front perspective view of a portion of the cockpit of the vehicle illustrating a drop-down display in the use position.
Figure 5:
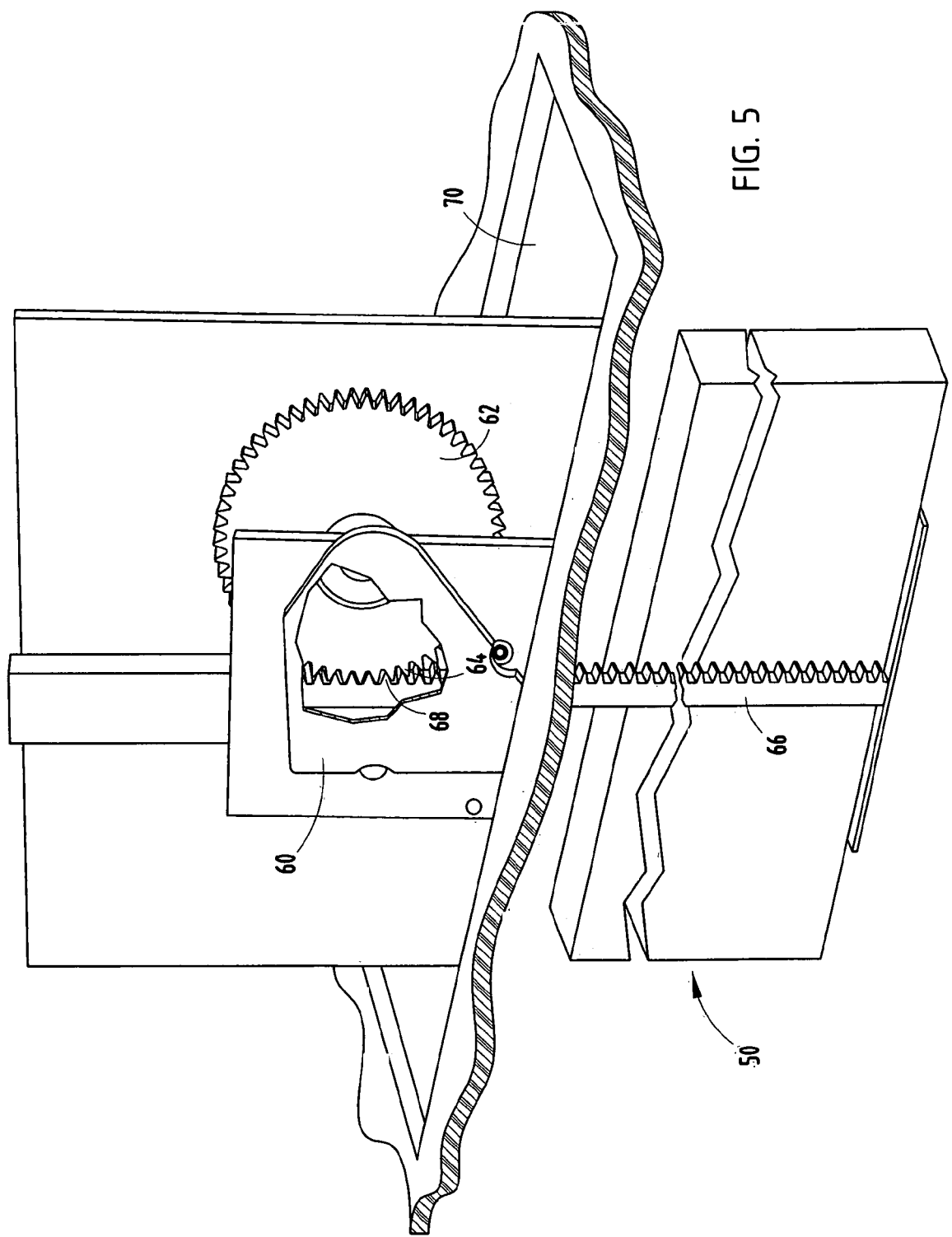
FIG. 5 is an enlarged rear perspective view of the display shown retracted in the use position and further illustrating the drive assembly.
Figure 6:
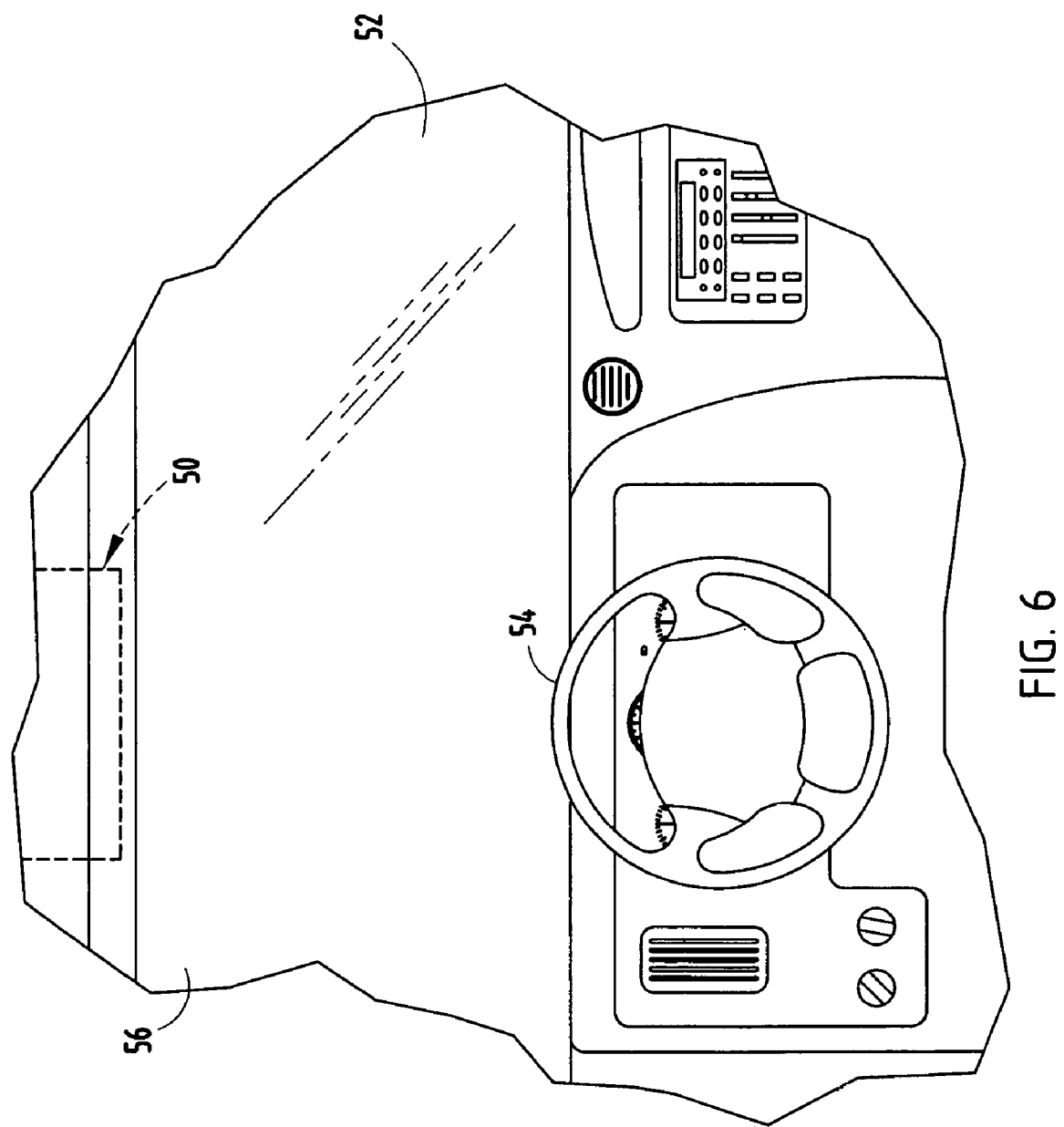
FIG. 6 is a front perspective view of the cockpit illustrating the drop-down display in the stowed position.
Figure 7:
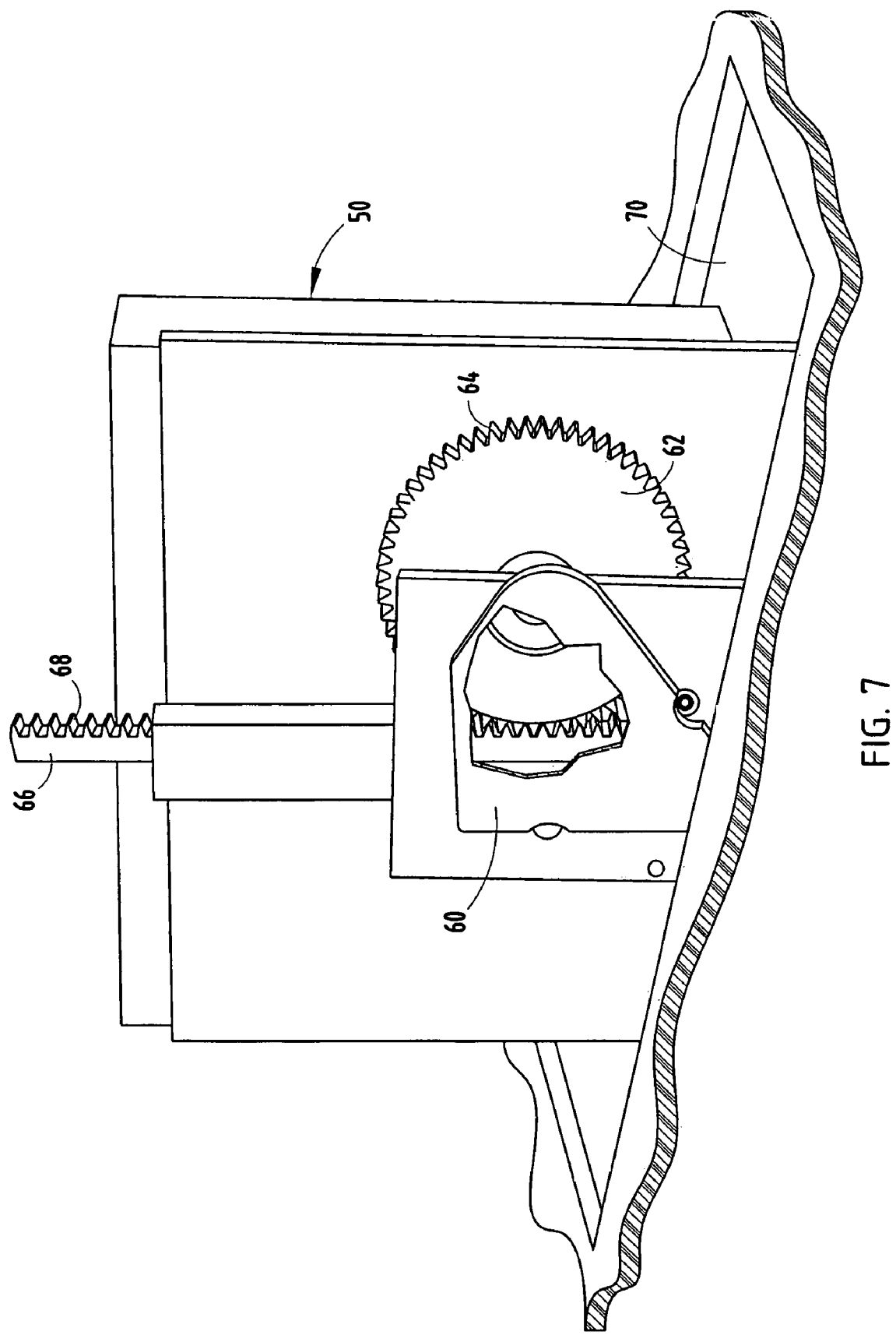
FIG. 7 is an enlarged rear perspective view of the display shown in the stowed position.

The onboard vehicle display 50 is further illustrated in FIGS. 4-7. The display 50 shown is a drop-down display that moves between an upward stowed position in an overhead storage compartment 56 as seen in FIGS. 6 and 7 and a use position in view forward of the driver above the steering wheel 54 as seen in FIGS. 4 and 5. The display 50 moves upward and downward through an opening 70 in the lower region of the overhead storage compartment 56. The display 50 is a forward view display located on the driver's centerline looking forward in front of windshield 52, and is easily viewable from the driver seat and the rear cab of the vehicle 10.

The drop-down display 50 may include a liquid crystal display (LCD), or other relatively thin panel monitor display. The display 50 is rigidly connected to a generally T-shaped transport rack 66 via fasteners, such as bolts, for example. Transport rack 66 has teeth 68 which engage teeth 64 of gear 62. Gear 62 is driven by a motor 60. The motor 60 is an electric motor that may be controlled by the controller 30 to drive the drop-down display 50 downward to the fully downward use position and to raise the display 50 to its retracted position fully stowed in compartment 56. The motor 60 and gear 62 are mounted in the overhead compartment 56.

It should be appreciated that the display 50 may include alternative automatic and manual actuated display devices. According to another embodiment, the drop-down display 50 may be manually actuated by the driver of the vehicle 10 between the upward stowed position and downward use position. According to a further embodiment, the display 50 may include a flip-type display in which the display pivots on one end between a downward extending use position and an upper stowed position. For example, a flip-type display could be integrated into the overhead visor of the vehicle 10 and pivot about one edge of the visor.

Figure 8:
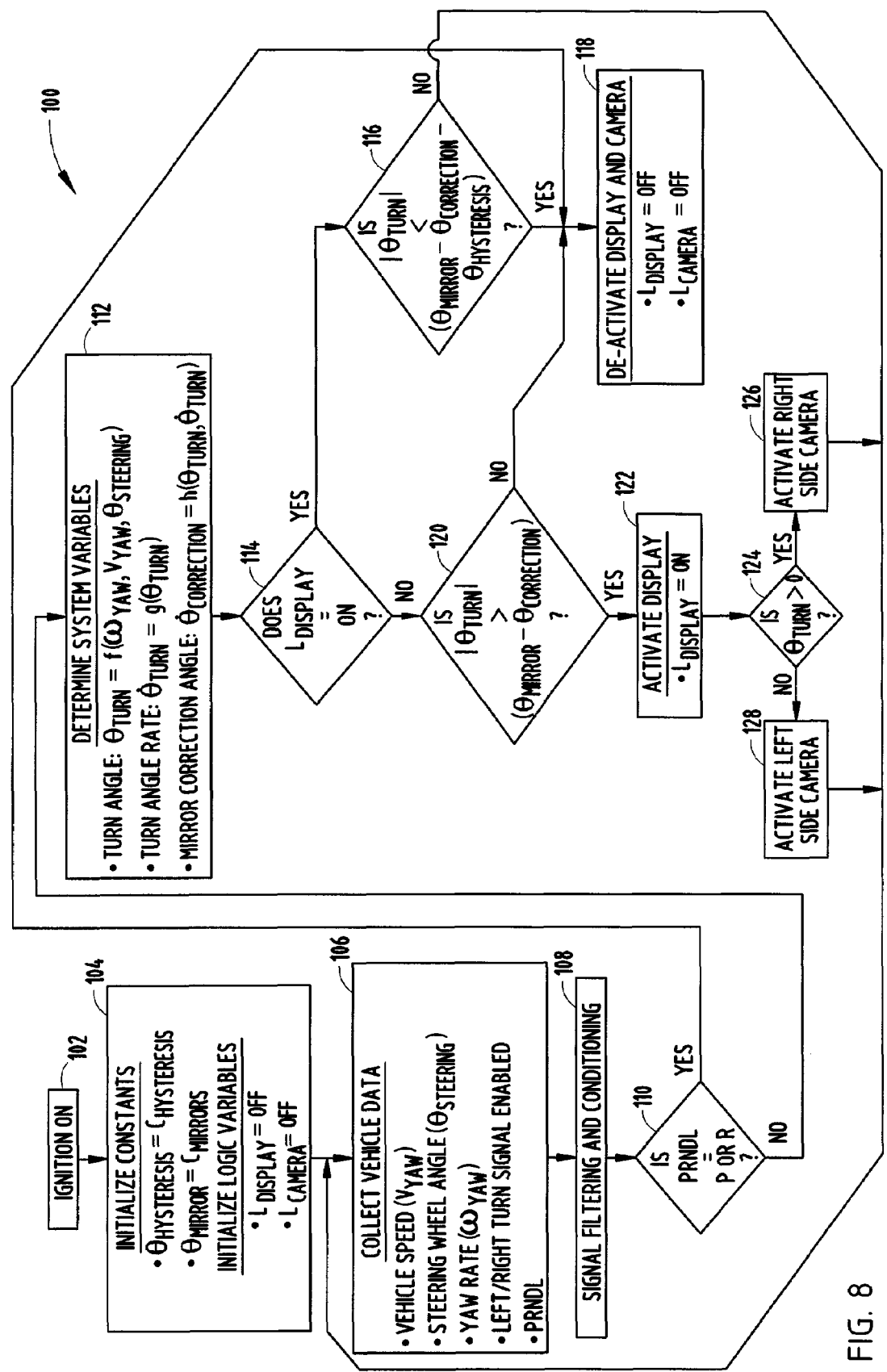
FIG. 8 is a flow diagram illustrating the turning assist routine employed by the turning assist system.

Referring to FIG. 8, the turning assist routine 100 is illustrated according to one embodiment. Routine 100 begins at step 102 when the vehicle ignition is turned on and, hence, the vehicle 10 is operating. Thereafter, variables and constants are initialized in step 104. The initialization step includes setting angle $\theta_{HYSTERESIS}$ equal to constant $C_{HYSTERESIS}$ and setting angle $\theta_{MIRROR}$ equal to constant $C_{MIRRORS}$. Angle $\theta_{HYSTERESIS}$ defines the amount of angular hysteresis that is factored in when determining if the vehicle is turning or no longer turning. Angle $\theta_{MIRROR}$ represents the angular field of view of the side view mirrors. Additionally, the display and camera logic variables $L_{DISPLAY}$ and $L_{CAMERA}$, respectively, are set to the logic off setting.

Following the initialization, turning assist routine 100 proceeds to step 106 to collect vehicle data. The vehicle data collected includes the vehicle speed ($V_{YAW}$), the steering wheel angle ($\theta_{STEERING}$), and the sensed yaw rate ($\omega_{YAW}$). Additionally, the collected vehicle data includes the left and right turn signals and the transmission position indicator signal PRNDL. The collected vehicle data signals are then filtered and conditioned according to known signal processing techniques in step 108.

Proceeding to decision step 110, routine 100 determines if the vehicle transmission is engaged in either park (P) or reverse (R) and, if so, deactivates the display and cameras by setting the display and camera logic variables $L_{DISPLAY}$ and $L_{CAMERA}$ to the off setting. In effect, the turning assist system 20 is disabled whenever the vehicle 10 is in park or reverse, according to one embodiment. It should be appreciated that according to another embodiment, the turning assist system 20 may be enabled when the vehicle 10 is in reverse to provide turning assist viewing when the vehicle 10 is backing up.

The turning assist routine 100 determines several system variables in step 112. These system variables include the turn angle $\theta_{TURN}$, the turn angle rate $\theta_{TURN}$, and the mirror correction angle $\theta_{CORRECTION}$. The turn angle $\theta_{TURN}$ may be estimated as a function of the yaw rate $\omega_{YAW}$, vehicle speed $V_{YAW}$, and the steering angle $\theta_{STEERING}$, according to one embodiment. This may be achieved by using the steering angle $\theta_{STEERING}$ when vehicle speed $V_{YAW}$ is less than a speed threshold e.g., ten miles per hour. The angle $\theta_{TURN}$ may be determined based on various one or more parameters including any of the steering wheel angle $\theta_{STEERING}$, vehicle speed $V_{YAW}$, yaw rate $\omega_{YAW}$, left and right turn signals and other data.

The turn angle rate $\theta_{TURN}$ may be determined by computing the derivative of the turn angle $\theta_{TURN}$. Turn angle rate $\theta_{TURN}$ is the rate of change of the turn angle as a function of time. The mirror correction angle $\theta_{CORRECTION}$ defines the field of view not seen in the viewing angle of the mirror. The mirror correction angle $\theta_{CORRECTION}$ may be determined as a function of the turn angle $\theta_{TURN}$ and the turn angle rate $\theta_{TURN}$. This determination is predetermined based on the vehicle geometry including any towed structures.

Turn assist routine 100 determines if the display logic $L_{DISPLAY}$ setting is set on in step 114. If the display logic $L_{DISPLAY}$ is set on, routine 100 proceeds to step 116 which determines if the absolute value of the turn angle $\theta_{TURN}$ is less than the mirror angle $\theta_{MIRROR}$ minus both the correction angle $\theta_{CORRECTION}$ and angle $\theta_{HYSTERESIS}$ and, if so, returns to step 106. If the absolute value of the turn angle $\theta_{TURN}$ is greater than or equal to the mirror angle $\theta_{MIRROR}$ minus both the correction angle $\theta_{CORRECTION}$ and hysteresis angle $\theta_{HYSTERESIS}$, then routine 100 proceeds to step 118 to deactivate the display and cameras by setting the camera and display logic $L_{CAMERA}$ and $L_{DISPLAY}$ to off before returning to step 106. Accordingly, routine 100 deactivates the display and the cameras whenever the turn angle $\theta_{TURN}$ is less than a turn threshold, wherein the turn threshold is determined as a function of the mirror angle $\theta_{MIRROR}$, correction angle $\theta_{CORRECTION}$, and hysteresis angle $\theta_{HYSTERESIS}$, according to the embodiment shown.

Returning back to step 114, if the display logic $L_{DISPLAY}$ is set to off, turn assist routine 100 proceeds to decision step 120 to determine if the absolute value of the turn angle $\theta_{TURN}$ is greater than the mirror angle $\theta_{MIRROR}$ minus the correction angle $\theta_{CORRECTION}$, and, if not, deactivates the display and cameras by setting logic $L_{DISPLAY}$ and $L_{CAMERA}$ off in step 118, before returning to step 106. If the absolute value of the turn angle $\theta_{TURN}$ is less than or equal to the difference in the mirror angle $\theta_{MIRROR}$ and correction angle $\theta_{CORRECTION}$, routine 100 activates the display in step 122 by setting the display logic $L_{DISPLAY}$ on, and then proceeds to activate the appropriate side camera. This includes decision step 124 which determines if the turn angle $\theta_{TURN}$ is to the right or left. If the vehicle is determined to be turning to the right in decision step 124, then the right side camera is activated in step 126. Otherwise, if the vehicle is determined to be turning left, then the left side camera is activated in step 128. Thereafter, routine 100 is repeated by returning to step 106, until the vehicle ignition is turned off.

Accordingly, the turn assist routine 100 estimates the turn angle $\theta_{TURN}$, and determines when the vehicle 10 is turning sufficiently beyond a threshold angle sufficient to require activation of a side view camera and the display to aid while the vehicle is performing a tight turning maneuver. The captured video images from the activated camera are displayed on the drop-down display 50 to enable the driver of the vehicle 10 to monitor the side view blind zone when performing the turning maneuver.

The vehicle turning maneuver assist system 20 and turn assist routine 100 advantageously provides for a low cost integrated turn assist system for assisting the driver of the vehicle 10 in maneuvering the vehicle 10 during a tight turning maneuver. It should be appreciated that various components of the system 20 including the video cameras 22A and 22B, display 50, and IR illuminators 28A and 28B may be integrated within the vehicle 10 to provide other functionality. For example, the side view cameras 22A and 22B, IR illuminators 28A and 28B, and display 50 could be employed to provide vehicle security monitoring as disclosed in U.S. application Ser. No. 11/123,429, entitled "VEHICLE SECURITY MONITOR SYSTEM AND METHOD," filed on the same date, the entire disclosure of which is hereby incorporated herein by reference. The cameras 22A and 22B, IR illuminators 28A and 28B, and display 50 could also serve to monitor the adjacent lanes for assistance in changing lanes. It should further be appreciated that the drop-down display 50 may be employed to display video images and information using any of a number of applications including navigation, entertainment and other information.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A turning maneuver assist system for a trailer towing vehicle having a trailer body connected to the vehicle by way of a hitch, said system comprising:
   a first camera positioned on a first side of the vehicle to generate video images on the first side of the vehicle and the trailer body;
   a second camera positioned on a second side of the vehicle to generate video images on the second side of the vehicle and the trailer body;
   a drop-down display located onboard the vehicle stowable in an overhead compartment forward of a driver of the vehicle and deployable downward to a use position viewable by the driver for displaying images generated by one of the first and second video cameras when one of the first and second video cameras is activated, wherein the display comprises an actuator for actuating the display downward to the use position and upward to a stowed position; and a controller for controlling activation of the first and second cameras and presentation of the images on the display, wherein the controller activates the display to output images captured by one of the first and second cameras when the vehicle is determined to be sufficiently turning and deactivates the display when the vehicle is determined not to be sufficiently turning.

2. The system as defined in claim 1, wherein the first camera is activated when the vehicle is determined to be sufficiently turning in a direction towards the first side of the vehicle and the second camera is activated when the vehicle is determined to be sufficiently turning in a direction towards the second side of the vehicle.

3. The system as defined in claim 1, wherein the controller estimates a turn angle of the vehicle and activates one of said first or second cameras when the estimated turn angle exceeds a threshold angle.

4. The system as defined in claim 3, wherein the controller estimates a turn angle of the vehicle as a function of a sensed yaw rate and activates the first and second cameras when the turning angle exceeds the threshold angle.

5. The system as defined in claim 1, wherein the controller activates one of the first and second cameras when the vehicle is determined to be turning at an angle greater than a threshold angle.

6. The system as defined in claim 5, wherein the controller determines the turning angle based on the sensed steering wheel angle.

7. The system as defined in claim 1, wherein the drop-down display is stowed in a position in the overhead compartment when not activated and wherein the controller activates the actuator to activate the display when the vehicle is determined to be sufficiently turning to move the display downward into a viewable position.

8. The system as defined in claim 7, wherein the actuator of the drop-down display comprises a motor and a transport rack.

9. The system as defined in claim 1, wherein the trailer towing vehicle comprises a fifth wheel hitch for trailoring the trailer body.

10. The system as defined in claim 1, wherein the vehicle comprises a commercial truck.

11. The system as defined in claim 1, wherein the vehicle further comprises left and right side side view mirrors.

12. A method of assisting a driver of a trailer towing vehicle having a trailer body connected by way of a hitch when the vehicle is turning, said method comprising the steps of:

determining when the vehicle is sufficiently turning toward a first side of the vehicle;

activating a first camera located on the first side of the vehicle to capture video images on the first side of the vehicle and the trailer body when the vehicle is determined to be turning towards the first side;

activating an actuator to deploy a drop-down display from a stowed position in an overhead compartment to a lowered use position forward of a driver of the vehicle such that the display is viewable by the driver;

displaying the video images captured by the first camera on the display onboard the vehicle when the vehicle is determined to be sufficiently turning toward the first side; and deactivating images provided by the first camera on the display when the vehicle is not determined to be sufficiently turning in a direction toward the first side.

13. The method as defined in claim 12, wherein the method further comprises the steps of:

determining when the vehicle is sufficiently turning toward a second side of the vehicle;

activating a second camera positioned on the second side of the vehicle to capture video images on the second side of the vehicle and the trailer body when the vehicle is determined to be sufficiently turning toward the second side;

deploying the drop-down display from the stowed position in the overhead compartment to the lowered use position;

displaying the captured video images on a display when the vehicle is determined to be sufficiently turning toward the second side; and deactivating the display of images generated by the second camera when the vehicle is not sufficiently turning toward the second side.

14. The method as defined in claim 12 further comprising the steps of:

sensing yaw rate;

estimating a turn angle of the vehicle as a function of sensed yaw rate; and comparing the estimated turn angle to a predetermined angle to determine the vehicle is sufficiently turning.

15. The method as defined in claim 12, wherein the step of activating an actuator comprising activating a motor to move the drop-down display from the stowed position to a viewable position when the vehicle is determined to be sufficiently turning toward one of the left and right sides.

16. The method as defined in claim 12, wherein the vehicle comprises a fifth wheel hitch for towing the trailer body.

17. The method as defined in claim 12, wherein the vehicle comprises a commercial truck.

18. The method as defined in claim 12, wherein the vehicle comprises side view mirrors.

19. The method as defined in claim 12, wherein the vehicle comprises a semi-truck having the overhead compartment generally forward of the driver in a view above the windshield, wherein the dropdown display is stowed at least partially within the overhead compartment.

20. The system as defined in claim 1, wherein the vehicle comprises a semi-truck having the overhead compartment generally forward of the driver in a view above the windshield, wherein the dropdown display is stowed at least partially within the overhead compartment.

21. The system as defined in claim 1, wherein the actuator comprises a motor for driving the display between a downward use position and an upward stowed position, wherein the drop-down display is actuated downward into the use position generally located on the driver's centerline when the vehicle is determined to be sufficiently turning, and is actuated to the upward stowed position when the vehicle is no longer determined to be sufficiently turning.

22. The method as defined in claim 12, wherein the step of activating an actuator comprises activating a motor to drive the display downward to the lowered use position generally located on the driver's centerline when the vehicle is determined to be sufficiently turning, and further comprising the step of activating the motor to drive the drop-down display to an upward stowed position when the vehicle is no longer determined to be sufficiently turning.

* * * * *